United States Patent [19]
Anbe

[11] Patent Number: 5,509,285
[45] Date of Patent: Apr. 23, 1996

[54] METHOD AND APPARATUS FOR MEASURING FLATNESS AND ROLLING CONTROL APPARATUS

[75] Inventor: Yoshiharu Anbe, Kodaira, Japan

[73] Assignee: Kabushiki Kaisha Toshiba, Kawasaki, Japan

[21] Appl. No.: 453,679

[22] Filed: May 30, 1995

Related U.S. Application Data

[63] Continuation of Ser. No. 917,425, Jul. 23, 1992, abandoned.

[30] Foreign Application Priority Data

Jul. 24, 1991 [JP] Japan ..................... 3-184705

[51] Int. Cl.⁶ ............................................. B21B 37/06
[52] U.S. Cl. ......................... 72/8.6; 72/201; 72/9.1
[58] Field of Search .......................... 72/10, 14, 17, 72/12, 201, 241.2, 241.8; 73/159

[56] References Cited

U.S. PATENT DOCUMENTS

| | | | |
|---|---|---|---|
| 4,289,005 | 9/1981 | Cabaret et al. | 72/17 |
| 4,537,050 | 8/1985 | Bryant et al. | 72/12 |
| 4,633,693 | 1/1987 | Tahara et al. | 72/17 |
| 4,726,213 | 2/1988 | Manchu | 72/241.8 |
| 4,809,528 | 3/1989 | Lawson et al. | 72/17 |

FOREIGN PATENT DOCUMENTS

| | | | |
|---|---|---|---|
| 3721746 | 1/1989 | Germany | 72/17 |
| 0187210 | 7/1990 | Japan | 72/14 |

*Primary Examiner*—Lowell A. Larson
*Assistant Examiner*—Thomas C. Schoeffler
*Attorney, Agent, or Firm*—Foley & Lardner

[57] ABSTRACT

A rolled strip extending out of a rolling stand is pushed by a push roll to apply a tension to the strip. The flatness measuring surface of a flatness bar is moved above the pass line to measure flatness values at a plurality of points in the widthwise direction of the rolled strip, based on the applied tension. A rolling control apparatus includes an actuator pair disposed symmetrically with drive and work sides of the rolling stand, for adjusting the flatness of the rolled strip, a flatness measuring apparatus provided at the delivery side of the rolling stand for measuring flatness values at a plurality of points in the widthwise direction of the rolled strip immediately after the rolled strip extends out of the rolling stand, based on the flatness measuring method, and a flatness controller for controlling an actuator on the drive side so as to reduce a drive side flatness error calculated from measuring values obtained by the flatness measuring apparatus on the drive side as viewed from the center of the rolled strip, and controlling the other actuator on the work side so as to reduce a work side flatness error calculated from measured values on the work side.

1 Claim, 4 Drawing Sheets

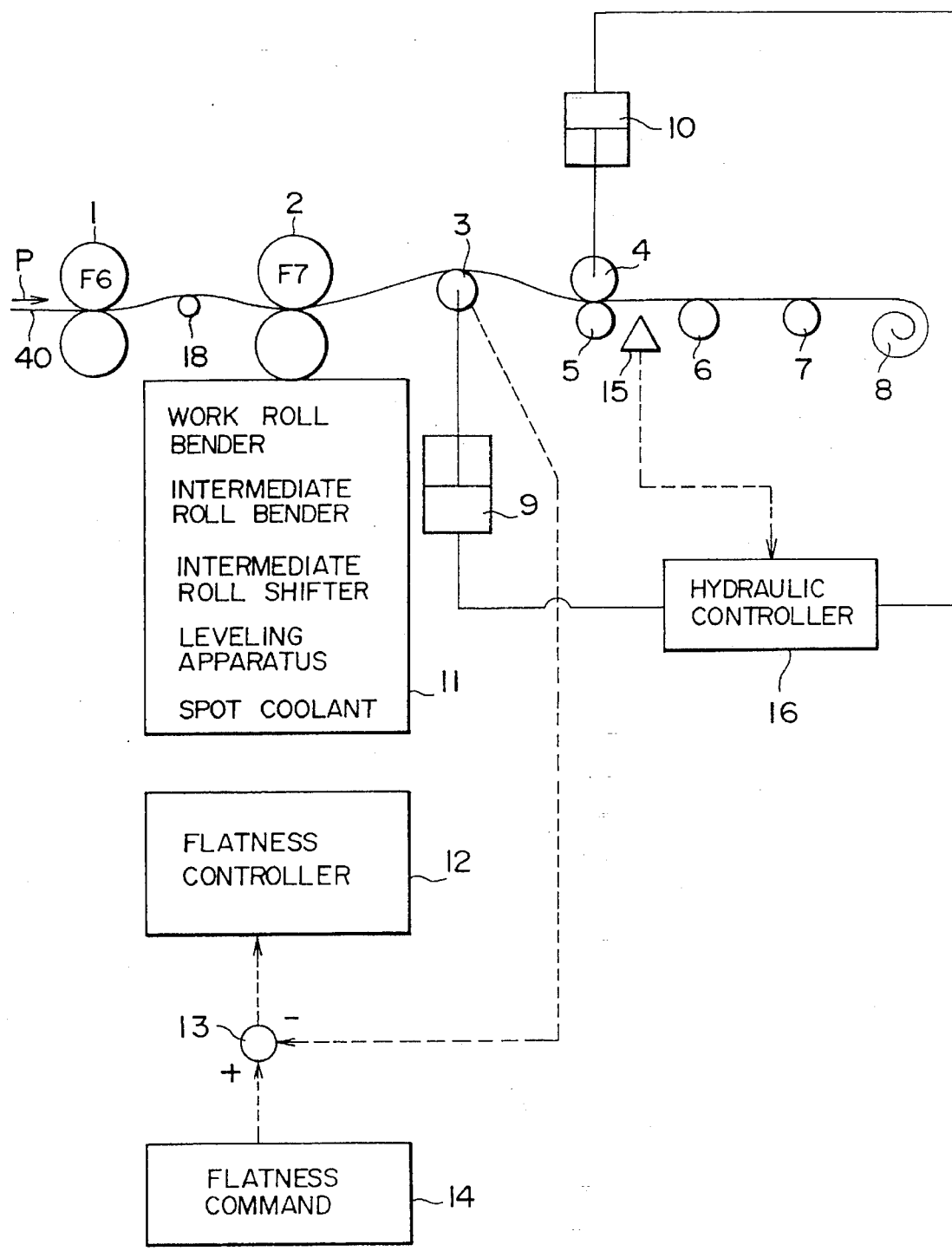
F I G. 1

METHOD AND APPARATUS FOR MEASURING FLATNESS AND ROLLING CONTROL APPARATUS

This application is a continuation of application Ser. No. 07/917,425, filed Jul. 23, 1992, now abandoned.

FIELD OF THE INVENTION

The present invention relates to a method and apparatus for measuring a flatness of a rolled strip in the widthwise direction at the exit of a rolling stand, and an apparatus for controlling the flatness of a rolled strip by using such method and apparatus.

PRIOR ART

In order to control the flatness of a rolled strip in the widthwise direction, it is essential to first measure a flatness of a rolled strip. It is known that a flatness of a rolled strip is measured from a tension applied to the rolled strip (for example, refer to "Iron and Steel Engineer" August 1986, pp 48 to 56). There is also known a flatness measuring apparatus having a plurality of elements for measuring a flatness from a tension (hereinafter called "flatness measuring elements") disposed at a predetermined pitch in the widthwise direction at particular positions of a rolled strip. The apparatus for measuring a flatness from tension cannot measure a flatness unless tension is being applied to a rolled strip.

Therefore, a flatness measuring apparatus installed at the exit of a final rolling stand of a continuous rolling mill can start measurements only after the top of a rolled strip is wound about a coiler. Therefore, until the top of a rolled strip is wound about the coiler after it passed through the rolling stand, it is impossible to carry out feedback control using the measurement results by the flatness measuring apparatus. For this reason, the accuracy of flatness is poor for a significantly large length from the rolled strip top, particularly in the case of a rolling facility having a long distance from the final rolling stand to the coiler.

Apart from the above, a plurality of types of flatness actuators have generally been provided in recent years in order to improve the accuracy of flatness of rolled strips. However, an established method of determining the manipulated variable for each flatness actuator is still not provided. Irrespective of an increased number of actuator types, the accuracy of flatness control has not been improved so much in practice.

SUMMARY OF THE INVENTION

It is an object of the present invention to provide a flatness measuring method and apparatus capable of making as short as possible the length of a rolled strip top portion having a poor flatness accuracy which has been considered heretofore unavoidable.

It is another object of the present invention to provide a rolling control apparatus capable of improving the flatness accuracy at the top portion of a rolled strip by rationally operating a plurality of flatness actuators.

According to one aspect of the present invention, a method of measuring a flatness of a rolled strip includes:

a first step of pushing a rolled strip downward by a push roll, the rolled strip extending out of a rolling stand and advancing on a runout table roller;

a second step of moving a flatness bar from a lower position to an upper position relative to a pass line after the push roll pushes the rolled strip, the flatness bar being provided between the rolling stand and the push roll; and a third step of measuring flatness values at a plurality of points in the widthwise direction of the rolled strip by using a flatness bar based on tension.

According to another aspect of the present invention, a method of measuring a flatness of a rolled strip includes:

a first step of pushing a rolled strip extending out of a rolling stand and reaching at least two runout table rollers, downward by a push roll at a position upstream of the runout table roller nearest to the rolling stand;

a second step of moving a flatness bar from a lower position to an upper position relative to a pass line, the flatness bar being provided between the rolling stand and the push roll; and a third step of measuring flatness values at a plurality of points in the widthwise direction of the rolled strip by using the flatness bar based on tension.

According to a further aspect of the present invention, an apparatus for measuring a flatness includes:

a flatness bar provided at the delivery side of a rolling stand in the widthwise direction of a rolled strip;

a first push roll for pushing the rolled strip downward at a position downward of the flatness bar;

first driving means for retracting the first push roll above a pass line before the rolled strip threads through the first push roll, and for pushing the rolled strip by lowering the first push roll after the rolled strip threads through the first push roll;

second driving means for retracting the flatness bar below the pass line before the first push roll pushes the rolled strip, and for raising the flatness bar to set the flatness measuring surface of the flatness bar above the pass line, immediately after the first push roll pushes the rolled strip.

According to a still further aspect of the present invention, a rolling control apparatus includes:

at least one pair of actuators disposed symmetrically on the drive and work sides as viewed from the center of a rolling stand in the widthwise direction, for adjusting the flatness of the rolled strip;

flatness measuring means provided at the delivery side of the rolling stand for measuring flatness values at a plurality of points in the widthwise direction of the rolled strip immediately after the rolled strip extends out of the rolling stand, based on tension applied to the rolled strip; and a flatness controller for controlling one of the at least one actuator pair on the drive side so as to reduce a drive side flatness error calculated from differences between command values and a plurality of corresponding measured values obtained by the flatness measuring means on the drive side as viewed from the center of the rolled strip, and controlling the at least one other actuator pair on the work side so as to reduce a work side flatness error calculated from differences between command values and a plurality of corresponding measured values on the work side.

BRIEF DESCRIPTION OF THE DRAWINGS

In the accompanying drawings:

FIG. 1 is a block diagram showing the structure of an embodiment of the present invention, with a rolling system being shown together;

DETAILED DESCRIPTION OF THE PREFERRED EMBODIMENTS

Figure 2:
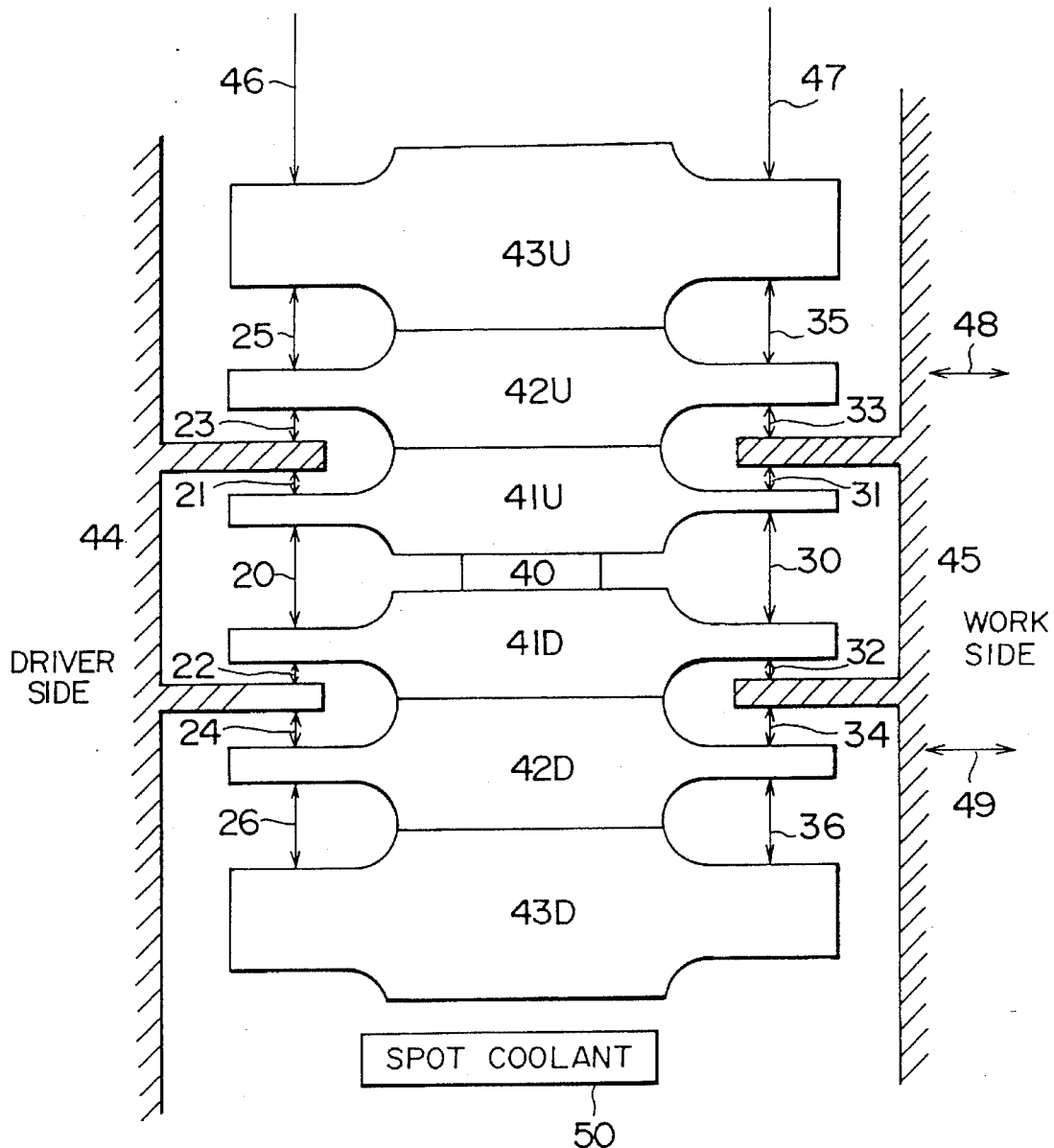
FIG. 2 shows the details of flatness actuators according to an embodiment of the present invention.

The present invention will be described in more detail with reference to the accompanying drawings.

FIG. 1 is a block diagram showing the structure of an embodiment of the present invention, with a rolling system being shown together. In FIG. 1, as an example of a continuous rolling mill, there are shown only the last two stands, i.e., the sixth stand (F6) 1 and seventh stand (F7) 2 of a hot strip finishing mill having seven stands F1 to F7. Between both stands 1 and 2, a looper 18 in schematic representation is usually mounted. A strip 40 is rolled while advancing in the direction indicated by an arrow P in FIG. 1. After the rolled strip 40 passes (threads) through the stand 2, it is conveyed by runout table rollers 5, 6 and 7 disposed on the exit side of the stand 2, and wound about a coiler 8. The runout table rollers 5, 6 and 7 are driven by their motors (not shown). A runout table installed between the final stand 2 and coiler 8 is generally about 100 m long.

In order to control the flatness of the rolled strip 40 after threading, a flatness bar 3 is provided between the stand 2 and the first runout table roller 5. In order to allow a flatness measurement from tension immediately after the top of the rolled strip 40 passes through the runout table roller 5, a push roll 4 is mounted above the runout table roller 5. The flatness bar 3 is driven toward the rolled strip 40 from the bottom side thereof, by a hydraulic cylinder 9. The push roll 4 is driven toward the rolled strip 40 from the top side thereof, by a hydraulic cylinder 10. A strip detector 15 for the detection of a pass of the top of the rolled strip 40 is mounted between the first and second runout table rollers 5 and 6. A detection signal from the strip detector 15 is supplied to a hydraulic controller 16 which then controls the hydraulic cylinders 9 and 10. The hydraulic controller 16 operates to retract the push roll 4 above the runout table roller 5 and hold the flatness bar 3 with its flatness measurement surface flushing with a pass line, until the strip detector 15 outputs the detection signal. When the strip detector 15 outputs the detection signal, the hydraulic controller 16 operates to lower the push roll 4 to push the rolled strip 40 and immediately thereafter raise the flatness bar 3, so that its flatness measurement surface goes above the pass line.

In this condition, the flatness of the rolled strip 40 is measured with the flatness bar 3. The measured value is supplied to an adder 13 which outputs a difference between the measured value and a flatness command value from a flatness command device 14, to a flatness controller 12. The flatness controller 12 drives a flatness actuator 11 to set the difference to zero. The flatness actuator 11 is constructed of first and second actuators. The first actuator is selected from the group consisting of a work roll bender, intermediate roll bender, intermediate roll shifter, and leveling apparatus. The second actuator is a spot coolant. In this embodiment, the first actuator is assumed to have the work roll bender, intermediate bender, intermediate roll shifter and leveling apparatus.

FIG. 2 is a schematic diagram showing the details of the flatness actuator 11 at the stand 2. This stand 2 is a so-called six-high mill having a pair of work rolls 41U and 41D for rolling the rolled strip 40, a pair of intermediate rolls 42U and 42D mounted on the work rolls, and a pair of backup rolls 43U and 43D mounted on the intermediate rolls. The flatness actuators are mounted symmetrically on the drive side and work side. On the drive side, mounted on a drive side housing 44 are work roll benders 20, 21 and 22 for the work rolls 41U and 41D, intermediate roll benders 23, 24, 25 and 26 for the intermediate rolls 42U and 42D, and a leveling apparatus 46 for the backup rolls 43U and 43D. On the work side, mounted on a work side housing 45 are work roll benders 30, 31 and 32 for the work rolls 41U and 41D, intermediate roll benders 33, 34, 35 and 36 for the intermediate rolls 42U and 42D, and a leveling apparatus 47 for the backup rolls 43U and 43D. An upper intermediate roll shifter 48 for the upper intermediate roll 42U and a lower intermediate roll shifter 49 for the lower intermediate roll 42D are provided in common for both the drive and work sides. A spot coolant 50 is also mounted, and the coolant 50 has nozzles at positions corresponding to respective flatness measuring elements of the flatness bar 3.

The operation of the rolling control apparatus constructed as above will be described below.

It is necessary for a six-high hot strip mill to pass (thread) a rolled strip at a high speed. Therefore, prior to threading, the hydraulic cylinder 9 causes the upper measurement surface of the flatness bar 3 to flush with the pass line by holding the flatness bar 3 below the pass line, and the hydraulic cylinder 10 causes the push roll 4 to retract to a position sufficiently remote from the pass line above the runout table roller 5.

Next, the top of the rolled strip 40 passes through the stand 1, stand 2, flatness bar 3 and runout table roller 5. At this time the strip detector 15 detects the top of the rolled strip 40 and supplies the detection signal to the hydraulic controller 16. Then, the hydraulic controller 16 causes the hydraulic cylinder 10 to lower the push roll 4 and causes the rolled strip 40 to be pinched between the push roll 4 and the runout table roller 5. When the rolled strip 40 is pinched, the hydraulic controller 16 causes the hydraulic cylinder 9 to raise the flatness bar 3 for the start of the flatness measurement. In this case, since the hydraulic cylinders 9 and 10 have a fast response, the flatness measurement can start immediately after the top of the rolled strip 40 is detected by the strip detector 15.

The flatness value measured by the flatness bar 3 is supplied to the adder 13. The adder 13 outputs a difference between a flatness command value from the flatness command device 14 and the measured flatness value, to the flatness controller 12. The flatness controller 12 operates the flatness actuator 11 so as to set the difference to zero.

In the above manner, feedback control of the flatness starts immediately after the top of the rolled strip 40 passes, e.g., through the runout table roller 6.

The detailed operation of the flatness controller 12 will be described next.

The flatness bar 3 is constructed of 2n flatness measuring elements. The 2n flatness measuring elements are disposed in the widthwise direction of the rolled strip 40 at a predetermined pitch, symmetrically with the work and drive sides. The first to n-th flatness measuring elements are disposed on the drive side and the (n+1)-th to 2n-th flatness measuring elements are disposed on the work side, respectively as viewed from the center of the width of the rolled strip 40.

Representing a flatness value measured by the i-th flatness measuring element by $\beta_{iMEAS}$ and the corresponding flatness reference value, i.e., the i-th flatness command value outputted from the flatness command device 14 by $\beta_{iREF}$, the adder 13 outputs a difference $\Delta\beta_i$ given by the following expression, to the flatness controller 12:

$$\Delta\beta_i = \beta_{iREF} - \beta_{iMEAS} (i=1, 2, \ldots, 2n) \quad (1)$$

Next, the flatness controller 12 calculates the following expression for n differences $\Delta\beta_1, \Delta\beta_2, \ldots, \Delta\beta_n$ for the n flatness measuring elements on the drive side as viewed from the center of the rolled strip 40, to thereby obtain a square sum $J_1$. The flatness controller 12 then calculates manipulated variables of respective flatness actuators to obtain the minimum square sum $J_1$. In accordance with the manipulated variables, the flatness actuators on the drive side inclusive of the upper intermediate roll 42U are controlled.

$$J_1 = \sum_{i=1}^{n} \left( \Delta\beta_i - \frac{\partial\beta_i}{\partial F_{WBDS}} \cdot \Delta F_{WBDS} - \frac{\partial\beta_i}{\partial F_{IBDS}} \cdot \Delta F_{IBDS} - \frac{\partial\beta_i}{\partial L_{DS}} \cdot \Delta L_{DS} - \frac{\partial\beta_i}{\partial S_{fU}} \cdot \Delta S_{fU} \right)^2 \quad (2)$$

$$(i = 1, 2, 3, \ldots, n)$$

Next, the flatness controller 12 calculates the following expression for n differences $\Delta\beta_{n+1}, \Delta\beta_{n+2}, \ldots, \Delta\beta_{2n}$ for the n flatness measuring elements on the work side as viewed from the center of the rolled strip 40, to thereby obtain a square sum $J_2$. The flatness controller 12 then calculates manipulated variables of respective flatness actuators to obtain the minimum square sum $J_2$. In accordance with the manipulated variables, the flatness actuators on the work side inclusive of the lower intermediate roll 42U are controlled.

$$J_2 = \sum_{i=n+1}^{2n} \left( \Delta\beta_i - \frac{\partial\beta_i}{\partial F_{WBWS}} \cdot \Delta F_{WBWS} - \frac{\partial\beta_i}{\partial F_{IBWS}} \cdot \Delta F_{IBWS} - \frac{\partial\beta_i}{\partial L_{WS}} \cdot \Delta L_{WS} - \frac{\partial\beta_i}{\partial S_{fL}} \cdot \Delta S_{fL} \right)^2 \quad (3)$$

$$(i = n+1, n+2, \ldots, 2n)$$

where $\frac{\partial\beta_i}{\partial F_{WBDS}}$:

an influence coefficient of a drive side work roll bending force to the flatness, $\frac{\partial\beta_i}{\partial F_{WBWS}}$:

an influence coefficient of a work side work roll bending force to the flatness, $\frac{\partial\beta_i}{\partial F_{IBDS}}$:

an influence coefficient of a drive side intermediate roll bending force to the flatness, $\frac{\partial\beta_i}{\partial F_{IBWS}}$:

an influence coefficient of a work side intermediate roll bending force to the flatness, $\frac{\partial\beta_i}{\partial L_{DS}}$:

an influence coefficient of a drive side leveling to the flatness, $\frac{\partial\beta_i}{\partial L_{WS}}$:

an influence coefficient of a work side leveling to the flatness, $\frac{\partial\beta_i}{\partial S_{fU}}$:

an influence coefficient of an upper intermediate roll shift to the flatness, $\frac{\partial\beta_i}{\partial S_{fL}}$:

an influence coefficient of a lower intermediate roll shift to the flatness, $\Delta F_{WBDS}$: a manipulated variable of the drive side work roll bender, $\Delta F_{WBWS}$: a manipulated variable of the work side work roll bender, $\Delta F_{IBDS}$: a manipulated variable of the drive side intermediate roll bender, $\Delta F_{IBWS}$: a manipulated variable of the work side intermediate roll bender, $\Delta L_{DS}$: a manipulated variable of the drive side leveling apparatus, $\Delta L_{WS}$: a manipulated variable of the work side leveling apparatus, $\Delta S_{fU}$: a manipulated variable of an upper intermediate roll shift, and $\Delta S_{fL}$: a manipulated variable of a lower intermediate roll shift.

The influence coefficients of the expressions (2) and (3) can be calculated in advance, based upon the types of a rolling mill and a strip to be rolled, the rolling conditions such as a temperature, entry thickness, exit thickness, and width of a strip to be rolled, and the operation conditions such as roll circumferential speed, and lubricating oil. Alternatively, the influence coefficients may be actually measured.

In obtaining the square sums $J_1$ and $J_2$ of the expressions (2) and (3), it is obvious that the terms for the actuators actually used are effective, and the terms for the actuators not actually used should be omitted.

In order to solve the expression (2), the following relationships given by the expressions (4) to (7) are provided:

$$\frac{\partial J_1}{\partial(\Delta F_{WBDS})} = 0 \quad (4)$$

$$\frac{\partial J_1}{\partial(\Delta F_{IBDS})} = 0 \quad (5)$$

$$\frac{\partial J_1}{\partial(\Delta L_{DS})} = 0 \quad (6)$$

$$\frac{\partial J_1}{\partial (\Delta S_{fU})} = 0 \tag{7}$$

In accordance with the obtained manipulated variable $\Delta F_{WBDS,c}$ for the drive side work roll bender, manipulation variable $\Delta F_{IBDS,c}$ for the drive side intermediate roll bender, manipulated variable $\Delta L_{DS,c}$ for the drive side leveling apparatus, and manipulated variable $\Delta S_{fU,c}$ for the upper intermediate roll shift, the flatness controller 12 controls the work roll benders 20, 21 and 22, intermediate roll benders 23, 214, 25 and 26, upper intermediate roll shifter 48 and leveling apparatus 46.

The flatness controller 12 calculates a flatness difference $\Delta \beta_{iRES}$ still resident after the control using the manipulated variables, by the following expression:

$$\Delta \beta_{iRES} = \Delta \beta_i - \frac{\partial \beta_i}{\partial F_{WBDS}} \cdot \Delta F_{WBDS,c} - \frac{\partial \beta_i}{\partial F_{IBDS}} \cdot \tag{8}$$

$$\Delta F_{IBDS,c} - \frac{\partial \beta_i}{\partial L_{DS}} \cdot \Delta L_{DS,c} - \frac{\partial \beta_i}{\partial S_{fU}} \cdot \Delta S_{fU,c}$$

If the flatness difference $\Delta \beta_{iRES}$ (where i=1, 2, ..., n) is positive and the spot coolant 50 at the position corresponding to the i-th flatness measuring element is idle, then this element of the spot coolant 50 is activated. If the flatness difference $\Delta \beta_{iRES}$ becomes negative after the element of the spot coolant is activated, it is stopped.

In quite the same manner as above, after solving the expression (3), in accordance with the obtained manipulated variable $\Delta F_{WBWS,c}$ for the work side work roll bender, manipulated variable $\Delta F_{IBWS,c}$ for the work side intermediate roll bender, manipulated variable $\Delta L_{WS,c}$ for the work side leveling apparatus, and manipulated variable $\Delta S_{fL,c}$ for the lower intermediate roll shift, the flatness controller 12 controls the work roll benders 30, 31 and 32, intermediate roll benders 33, 34, 35 and 36, lower intermediate roll shifter 49 and leveling apparatus 47. Depending upon whether the calculated flatness difference $\Delta \beta_{iRES}$ (i=n+1, n+2, ..., 2n) still resident after control using the manipulated variables is positive or negative, the element of the spot coolant 50 is activated or stopped.

As described above, in this embodiment, flatness actuators on the drive side are controlled so as to make the measured values on the drive side as viewed from the center of the rolled strip coincide with the command values, and the flatness actuators on the work side are controlled so as to make the measured values on the work side coincide with the command values.

The magnitude of the manipulated variable for each flatness measured point is checked, and the spot coolant is controlled to finely adjust the manipulated variable.

In the flatness measuring apparatus of this embodiment, there are used the flatness bar 3 driven by the hydraulic cylinder 9, the push roll 4 driven by the hydraulic cylinder 10, the strip detector 15 for detecting a pass of the top of the rolled strip 40, and the hydraulic controller 16 for controlling the hydraulic cylinders 9 and 10 in accordance with the detection signal outputted from the strip detector 15. With such an arrangement, it is possible to control the flatness of the rolled strip at the top portion even if it is not still wound about the coiler, and considerably reduce the length of the top portion having a poor flatness accuracy.

The structure of the flatness measuring apparatus is not limited to only the above-described embodiment, but the following modification is also possible.

Figure 3:
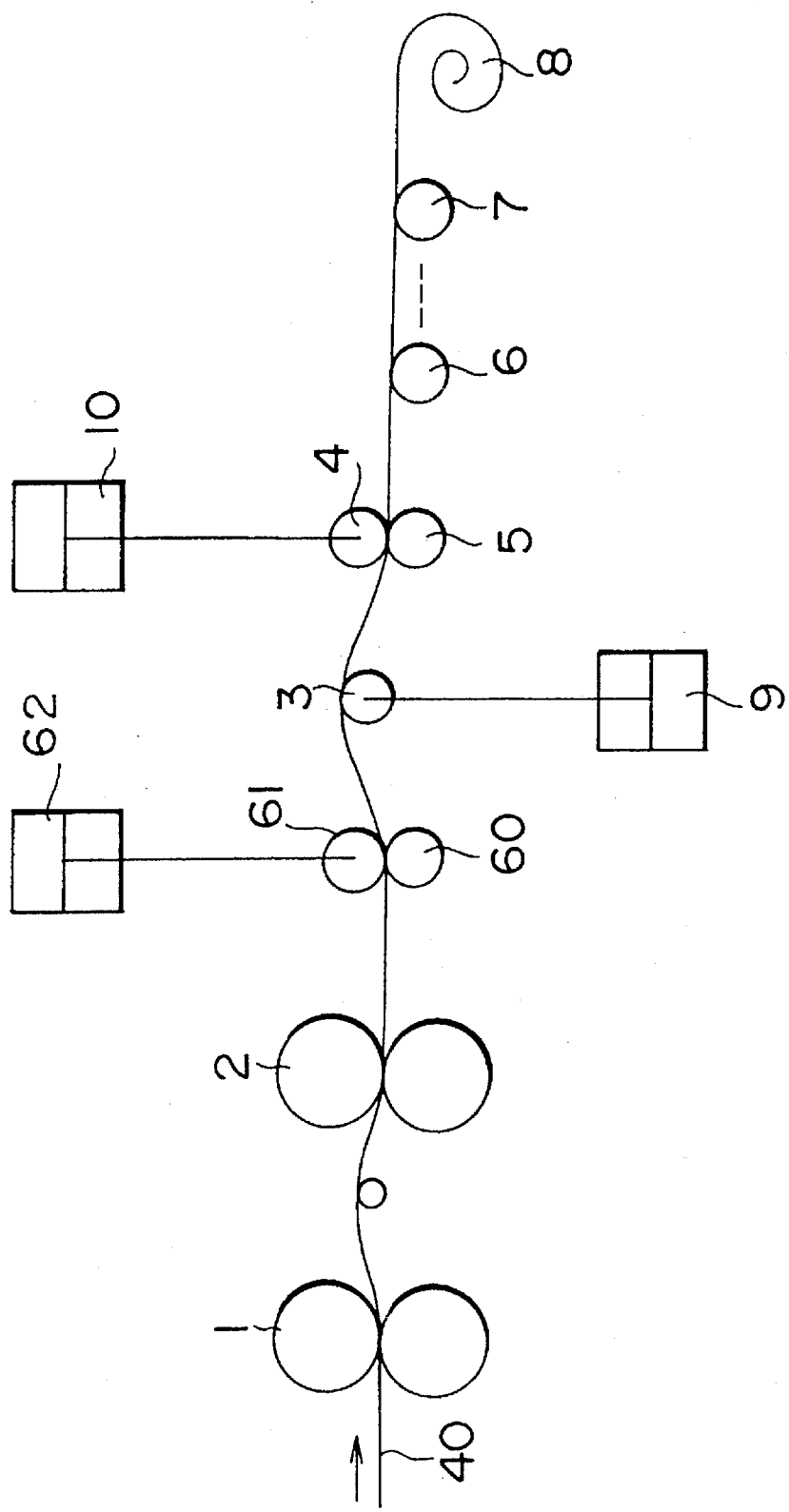
FIG. 3 shows the layout of main elements according to another embodiment of the present invention.

As shown in FIG. 3, another runout table roller 60 is provided between the stand 2 and runout table roller 5. A push roll 61 and hydraulic cylinder 62 are provided in correspondence with the runout table roller 60. The push rolls 61 and 4 mounted upstream and downstream of the flatness bar 3 pinch the rolled strip 40, and immediately thereafter, the flatness bar 3 is moved upward. With such an arrangement, any play of the rolled strip is not necessary to be taken into consideration, allowing a reliable measurement of even a thin strip.

Figure 4:
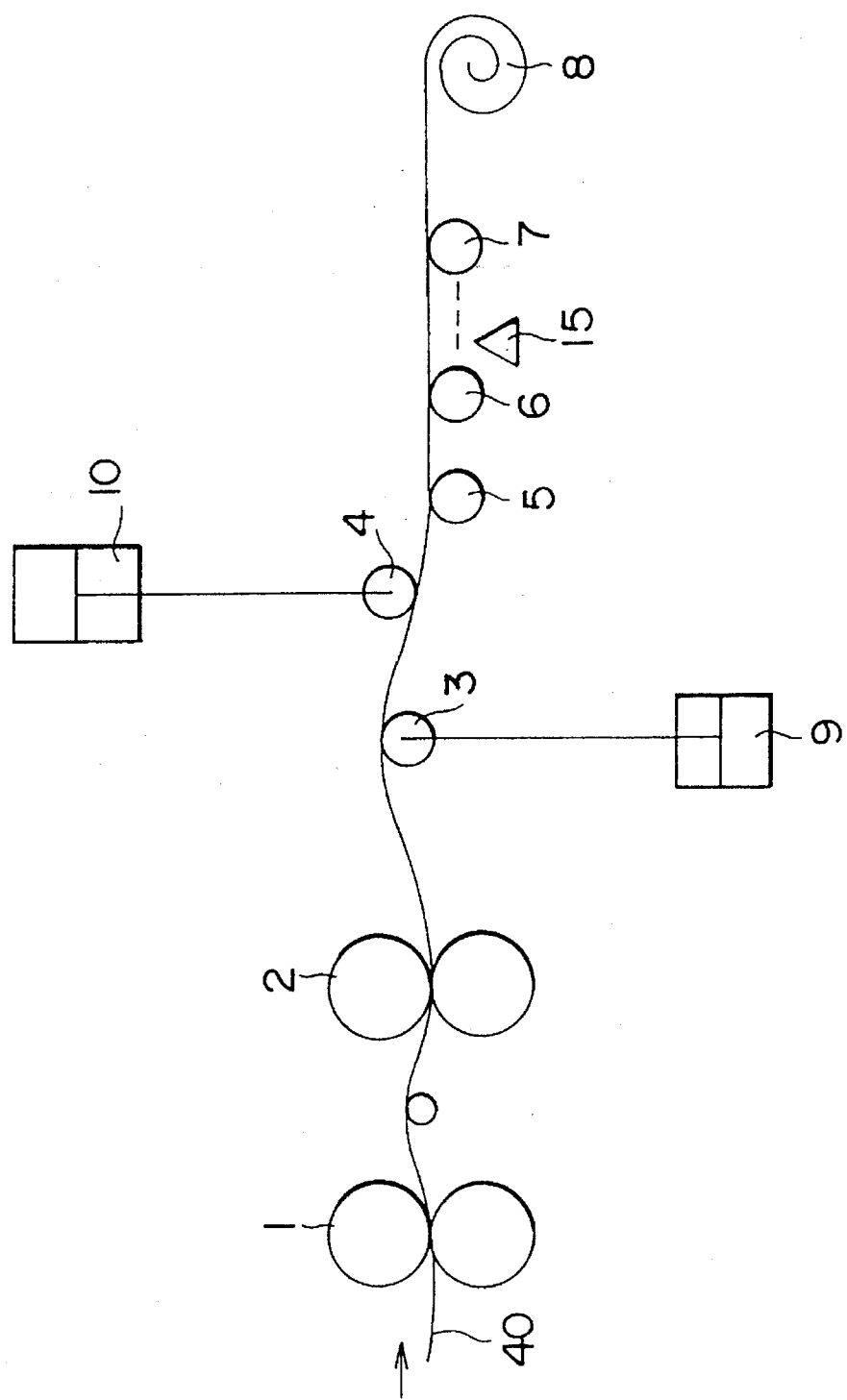
FIG. 4 shows the layout of main elements according to a further embodiment of the present invention.

The run-table rollers 5, 6 and 7 are rotated synchronously by motors, and the flatness can be measured if at least two of the runout table rollers 5, 6 and 7, e.g., rollers 5 and 6 contact with the rolled strip 40. FIG. 4 shows the structure of the flatness measuring apparatus realized basing upon this concept. The flatness bar 3 is provided between the stand 2 and runout table roller 5, and the push roll 4 is provided between the flatness bar 3 and runout table roller 5. When the strip detector 15 provided between the runout table rollers 6 and 7 detects a pass of the top of the rolled strip 40, the flatness bar 3 is raised and the push roll 4 is lowered. With this embodiment, it is also possible to control the flatness of the rolled strip at the top portion even if it is not still wound about the coiler, and to considerably reduce the length of the top portion having a poor flatness accuracy.

In the above embodiments, the flatness measuring apparatus is installed at the exit of the stand 2 to activate the flatness actuators at the stand 2 in accordance with the measured values obtained by the apparatus. The flatness measuring apparatus of the present invention is not limited to installation at the exit of the final stand 2, but may be installed at the exit of any rolling stand of a continuous rolling mill to control the flatness by using the obtained flatness feedback values.

The present invention is applicable not only to the six-high mill of the embodiment, but also to other mills such as two-high, four-high, and eight-high mills.

Furthermore, as an actuator a cross-angle actuator can be used in a pair-cross mill, or a pressure actuator can be used in a VC roll.

What is claimed is:

1. A rolling control apparatus comprising:

first and second pairs of actuators each being disposed symmetrically with respect to each other on respective drive and work sides of a rolling stand as viewed from a center of said rolling stand in a widthwise direction, said first and second pairs of actuators capable of adjusting a flatness of a rolled strip, said first and second pairs of actuators each including first and second actuator means, said first actuator means having a work roll bender, an intermediate roll bender, an intermediate roll shifter and a leveling apparatus, said intermediate roll shifter consisting of an upper shifter and a lower shifter, said second actuator means having a spot coolant;

flatness measuring means provided at an exit of said rolling stand for measuring flatness values at a plurality of points in a widthwise direction of said rolled strip immediately after said rolled strip extends out of said rolling stand, based on a tension applied to said rolled strip;

first calculating means for calculating differences $\Delta \beta_i$ between a plurality of measured values $\beta_{iMEAS}$ obtained by said flatness measuring means and respective corresponding command values $\beta_{iREF}$ in accordance with the following expression:

$$\Delta \beta_i = \beta_{iREF} - \beta_{iMEAS} (i=1, 2, \ldots, 2n)$$

second calculating means for calculating square sums $J_1$ and $J_2$ on said respective drive and work sides in accordance with the following expressions:

$$J_1 = \sum_{i=1}^{n} \left( \Delta\beta_i - \frac{\partial\beta_i}{\partial F_{WBDS}} \cdot \Delta F_{WBDS} - \frac{\partial\beta_i}{\partial F_{IBDS}} \cdot \Delta F_{IBDS} - \frac{\partial\beta_i}{\partial L_{DS}} \cdot \Delta L_{DS} - \frac{\partial\beta_i}{\partial S_{fU}} \cdot \Delta S_{fU} \right)^2$$

$(i = 1, 2, 3, \ldots, n)$ $$J_2 = \sum_{i=n+1}^{2n} \left( \Delta\beta_i - \frac{\partial\beta_i}{\partial F_{WBWS}} \cdot \Delta F_{WBWS} - \frac{\partial\beta_i}{\partial F_{IBWS}} \cdot \Delta F_{IBWS} - \frac{\partial\beta_i}{\partial L_{WS}} \cdot \Delta L_{WS} - \frac{\partial\beta_i}{\partial S_{fL}} \cdot \Delta S_{fL} \right)^2$$

$(i = n+1, n+2, \ldots, 2n)$ where $\frac{\partial\beta_i}{\partial F_{WBDS}}$ :

an influence coefficient of a drive side work roll bending force to the flatness, $\frac{\partial\beta_i}{\partial F_{WBWS}}$ :

an influence coefficient of a work side work roll bending force to the flatness, $\frac{\partial\beta_i}{\partial F_{IBDS}}$ :

an influence coefficient of a drive side intermediate roll bending force to the flatness, $\frac{\partial\beta_i}{\partial F_{IBWS}}$ :

an influence coefficient of a work side intermediate roll bending force to the flatness, $\frac{\partial\beta_i}{\partial L_{DS}}$ :

an influence coefficient of a drive side leveling to the flatness, $\frac{\partial\beta_i}{\partial L_{WS}}$ :

an influence coefficient of a work side leveling to the flatness, $\frac{\partial\beta_i}{\partial S_{fU}}$ :

an influence coefficient of an upper intermediate roll shift to the flatness, $\frac{\partial\beta_i}{\partial S_{fL}}$ :

an influence coefficient of a lower intermediate roll shift to the flatness, $\Delta F_{WBDS}$: a manipulated variable of the drive side work roll bender, $\Delta F_{WBWS}$: a manipulated variable of the work side work roll bender, $\Delta F_{IBDS}$: a manipulated variable of the drive side intermediate roll bender, $\Delta F_{IBWS}$: a manipulated variable of the work side intermediate roll bender, $\Delta L_{DS}$: a manipulated variable of the drive side leveling apparatus, $\Delta L_{WS}$: a manipulated variable of the work side leveling apparatus, $\Delta S_{fU}$: a manipulated variable of an upper intermediate roll shifter, $\Delta S_{fL}$: a manipulated variable of a lower intermediate roll shifter;

third calculating means for calculating manipulated variables for said first and second actuator means on said drive and work sides so as to minimize said respective square sums $J_1$ and $J_2$;

first controlling means for controlling said first actuator means on the drive side inclusive of said upper shifter of said intermediate roll shifter, and for controlling said second actuator means on the work side inclusive of said lower shifter of said intermediate roll shifter;

fourth calculating means for calculating a pair of flatness errors on said respective drive and work sides still resident after control by said first controlling means; and second controlling means for controlling said second actuator means so as to reduce said flatness errors calculated by said fourth calculating means.

* * * * *